US009950789B2

(12) United States Patent
Tsunekawa et al.

(10) Patent No.: US 9,950,789 B2
(45) Date of Patent: Apr. 24, 2018

(54) VERTICAL TAKE-OFF AND LANDING AIRCRAFT

(71) Applicant: IHI Corporation, Tokyo (JP)

(72) Inventors: Masayoshi Tsunekawa, Tokyo (JP); Tetsuya Tamura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 398 days.

(21) Appl. No.: 14/669,811

(22) Filed: Mar. 26, 2015

(65) Prior Publication Data

US 2015/0197337 A1 Jul. 16, 2015

Related U.S. Application Data

(63) Continuation of application No. PCT/JP2013/083733, filed on Dec. 17, 2013.

(30) Foreign Application Priority Data

Jan. 29, 2013 (JP) ................................ 2013-014223

(51) Int. Cl.
*B64C 29/00* (2006.01)
*B64C 27/20* (2006.01)
(Continued)

(52) U.S. Cl.
CPC ........ *B64C 29/0033* (2013.01); *B64C 11/001* (2013.01); *B64C 27/20* (2013.01); *B64C 27/52* (2013.01); *B64C 39/026* (2013.01)

(58) Field of Classification Search
CPC ... B64C 29/0033; B64C 11/001; B64C 27/20; B64C 27/52; B64C 39/026; B64C 29/00; B64C 27/22
See application file for complete search history.

(56) References Cited

U.S. PATENT DOCUMENTS 2,448,392 A 8/1948 Quady et al.
3,584,810 A 6/1971 Velton
(Continued)

FOREIGN PATENT DOCUMENTS

GB 2419122 * 4/2006 ............ B64C 29/00
GB 2419122 A 4/2006
(Continued)

OTHER PUBLICATIONS

Extended European Search Report, European Patent Application No. 13873269.8, dated May 2, 2016, 7 pgs.
(Continued)

*Primary Examiner* — Assres H Woldemaryam
(74) *Attorney, Agent, or Firm* — Volpe and Koenig, P.C.

(57) ABSTRACT

A vertical take-off and landing aircraft including a propulsion mechanism that generates lift and thrust, a main frame that supports seating and a landing undercarriage, a subframe which supports the propulsion mechanism and which is arranged so as to be swingable back and forth relative to the main frame, motive power supply means supported by the main frame and supplying motive power to the propulsion mechanism, and a control stick connected to the subframe in which the propulsion mechanism includes a pair of ducted fans arranged on a left side and a right side, respectively, of the main frame, swing shafts arranged in the ducted fans, and extending in a horizontal direction, and control vanes connected to the swing shafts, and swinging the control vane enables the subframe to move relative to the main frame. Maneuverability can be improved with addition of control mechanisms restrained.

4 Claims, 38 Drawing Sheets

(51) Int. Cl.
*B64C 27/52* (2006.01)
*B64C 39/02* (2006.01)
*B64C 11/00* (2006.01)

(56) References Cited

U.S. PATENT DOCUMENTS

| | | | | |
|---|---|---|---|---|
| 4,537,372 A | * | 8/1985 | Forizs | B64C 29/0033 244/12.4 |
| 2001/0040062 A1 | * | 11/2001 | Illingworth | B64C 11/001 180/117 |
| 2002/0003188 A1 | * | 1/2002 | Moshier | B64C 39/026 244/4 R |
| 2002/0047071 A1 | * | 4/2002 | Illingworth | B64C 11/001 244/199.1 |
| 2002/0104919 A1 | * | 8/2002 | Geranio | B64C 29/0025 244/2 |
| 2002/0113165 A1 | * | 8/2002 | Moshier | B64C 39/026 244/4 A |
| 2005/0109874 A1 | | 5/2005 | Baldwin | |
| 2006/0196991 A1 | | 9/2006 | Martin | |
| 2009/0014580 A1 | | 1/2009 | Piasecki et al. | |
| 2010/0051740 A1 | * | 3/2010 | Yoeli | B64C 29/0033 244/12.1 |
| 2010/0140415 A1 | * | 6/2010 | Goossen | B64C 27/20 244/23 A |
| 2011/0139939 A1 | * | 6/2011 | Martin | B64D 33/10 244/23 A |
| 2011/0163198 A1 | * | 7/2011 | Leaver | B64C 27/20 244/12.1 |
| 2012/0298790 A1 | * | 11/2012 | Bitar | B64C 27/12 244/17.11 |
| 2014/0110533 A1 | * | 4/2014 | Tsunekawa | B64C 27/20 244/7 R |
| 2015/0053826 A1 | * | 2/2015 | Tsunekawa | B64C 29/0033 244/23 A |

FOREIGN PATENT DOCUMENTS

| | | |
|---|---|---|
| JP | 2006-56364 A | 3/2006 |
| JP | 2008-531395 A | 8/2008 |
| JP | 2011-525879 A | 9/2011 |
| JP | 2013-10466 A | 1/2013 |
| WO | 2006/093420 A1 | 9/2006 |
| WO | 2013/002383 A1 | 1/2013 |

OTHER PUBLICATIONS

International Search Report, PCT/JP2013/083733, dated Mar. 18, 2014, 2 pgs.
Australian Office Action, Australian Patent Application No. 2013375961, dated Oct. 29, 2015, 9 pgs.

* cited by examiner

VERTICAL TAKE-OFF AND LANDING AIRCRAFT

TECHNICAL FIELD

The present invention relates to a vertical take-off and landing aircraft, and more particularly, to a vertical take-off and landing aircraft capable of generating lift without running on the ground.

BACKGROUND ART

Currently, helicopter is a typical example of vertical take-off and landing aircraft capable of generating lift without running on the ground. A helicopter has a large rotor, compared with its fuselage, and generates lift and thrust by rotating the rotor. There have also been known, though few in number of types, fixed-wing aircraft that perform vertical take-off and landing by changing the direction ox the thrust derived from jet engines.

The fuselage of a helicopter has a relatively large size itself, and in addition, the helicopter is equipped with a main rotor larger in size than the fuselage and a tail rotor at the tail of the fuselage. Thus, if take-off, landing or attitude control is performed in a small space surrounded by obstacles such as buildings or trees, the main rotor or the tail rotor may come into contact with the obstacles. Accordingly, a large space is needed for the take-off and landing.

In the case of a fixed-wing aircraft capable of vertical take-off and landing using jet engines, the jet exhaust is high in temperature and also the exhaust emission is large in volume. Accordingly, small objects such as stones are blown off by the jet exhaust during take-off or landing, possibly damaging surrounding buildings or the like. Thus, also in the case of the fixed-wing aircraft, a large space is needed for the take-off and landing.

There have already been proposed vertical take-off and landing (VTOL) aircraft capable of safe take-off and landing even in a small space (see Patent Documents 1 and 2, for example). The vertical take-off and landing aircraft disclosed in Patent Documents 1 and 2 are equipped with ducted fans having propeller type fans arranged within cylindrical ducts or nacelles.

Furthermore, a vertical take-off and landing aircraft (personal flying vehicle) described in Patent Document 2 has a control surface which has an aerofoil cross section and which controls rolling and pitching of the fuselage and control vanes that control yawing of the fuselage. This control system is set such that, whenever one of the control vanes is moved in one direction, the other control vane equally moves in the opposite direction, and is configured such that this movement yaws the fuselage leftward, whereas moving the control vanes in the opposite directions yaws the fuselage rightward.

PRIOR ART DOCUMENT

Patent Document

Patent Document 1: Japanese Patent Laid-Open No. 2006-056364
Patent Document 2: National Publication of International Patent Application No. 2011-525879

SUMMARY OF THE INVENTION

Problems to be Solved by the Invention

In the aforementioned vertical take-off and landing aircrafts described in Patent Document 1 and Patent Document 2, ducted fans that generate thrust are fixed to the fuselage. In general, the vertical take-off and landing aircrafts are configured such that the attitude of the fuselage is controlled by moving the center of gravity of the fuselage. However, to allow the fuselage to be easily maneuvered, the vertical take-off and landing aircrafts preferably includes control mechanisms dealing with the rolling, pitching, and yawing of the fuselage as described in Patent Document 2.

However, when all of the control mechanisms dealing with the rolling, pitching, and yawing are mounted in the vertical take-off and landing aircraft, problems may occur such as an increased weight of the fuselage and cumbersome maintenance.

The present invention has been created in view of the aforementioned problem, and an object of the present invention is to provide a vertical take-off and landing aircraft that allows maneuverability to be improved while restraining addition of control mechanisms.

Means for Solving the Problems

The present invention is a vertical take-off and landing aircraft having a propulsion mechanism that generates lift and thrust, a main frame that supports seating and a landing undercarriage, a subframe which supports the propulsion mechanism and which is arranged so as to be swingable back and forth relative to the main frame, motive power supply means supported by the main frame or the subframe and supplying motive power to the propulsion mechanism, and a control stick connected to the subframe, in which the propulsion mechanism includes at least a pair of ducted fans arranged on a left side and a right side, respectively, of the main frame, swing shafts arranged in the ducted fans and extending in a horizontal direction, and control vanes connected to the swing shafts, and swinging the control vanes enables the subframe to move relative to the main frame.

In the vertical take-off and landing aircraft according to the present invention, the propulsion mechanism is configured to be swingable relative to the main frame via the subframe. Thus, the propulsion mechanism can be deflected by manipulating the control stick and can thus be controlled without addition of a mechanism that controls yawing of the fuselage. Furthermore, the control vane is arranged in the ducted fan, and thus, the subframe can be moved relative to the main frame. This allows supplementation of a force exerted to manipulate the control stick in order to deflect the ducted fans. Consequently, the control stick can be manipulated with a reduced force.

Advantageous Effects of the Invention

The vertical take-off and landing aircraft according to the present invention allows maneuverability to be improved while restraining addition of control mechanisms.

MODE FOR CARRYING OUT THE INVENTION

Figure 1A:
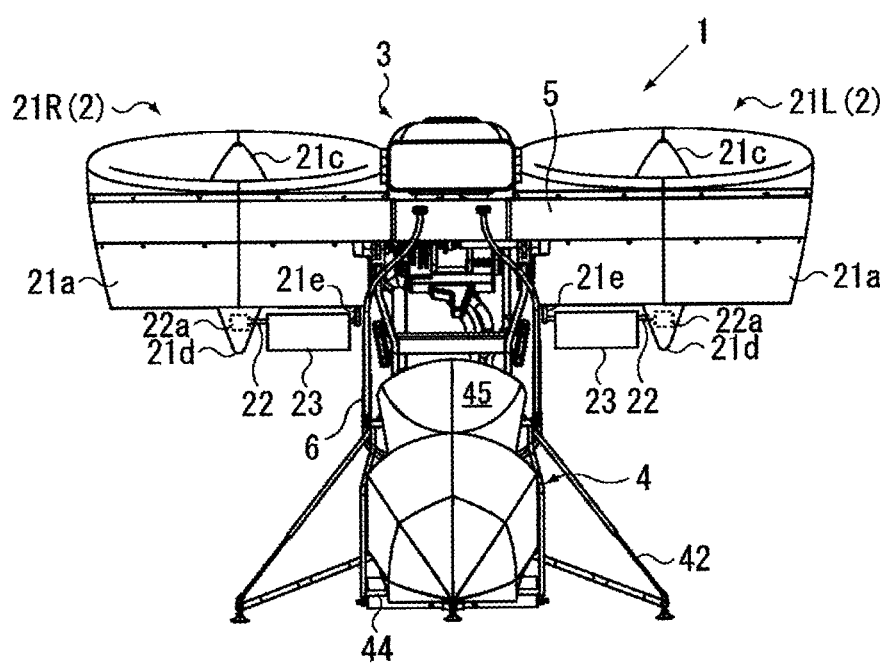
FIG. 1A is a front view showing a vertical take-off and landing aircraft according to a first embodiment of the present invention.
Figure 1B:
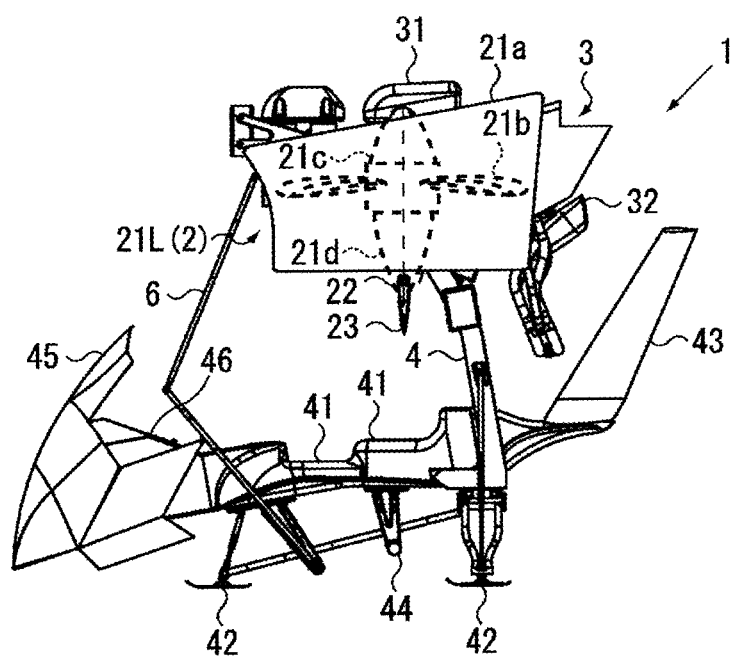
FIG. 1B is a side view showing the vertical take-off and landing aircraft according to the first embodiment of the present invention.
Figure 1C:
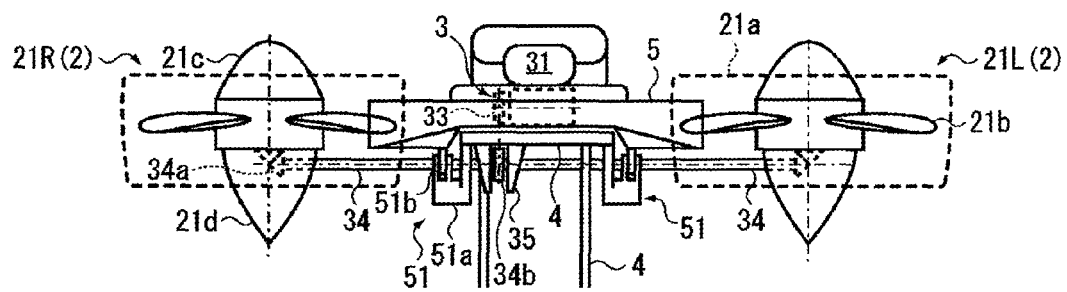
FIG. 1C is a configuration diagram showing a power transmission mechanism of the vertical take-off and landing aircraft according to the first embodiment of the present invention.

Embodiments of the present invention will be described below with reference to FIGS. 1A to 11C. FIGS. 1A to 1C are diagrams showing a vertical take-off and landing aircraft according to a first embodiment of the present invention.

FIG. 1A is a front view, FIG. 1B is a side view, and FIG. 1C is a configuration diagram showing a power transmission mechanism.

As shown in FIG. 1A and FIG. 1B, a vertical take-off and landing aircraft 1 according to the first embodiment of the present invention has a propulsion mechanism 2 that generates lift and thrust, a main frame 4 that supports seating 41 and a landing undercarriage 42, a subframe 5 arranged to support the propulsion mechanism 2 and to enable the propulsion mechanism 2 to swing back and forth relative to the main frame 4, motive power supply means 3 supported by the main frame 4 and supplying motive power to the propulsion mechanism 2, and a control stick 6 connected to the subframe 5. The propulsion mechanism 2 includes a pair of ducted fans 21L, 21R arranged on a left side and a right side, respectively, of the main frame 4, swing shafts 22 arranged on the ducted fans 21L, 21R and extending in a horizontal direction, and control vanes 23 connected to the awing shafts 22. Swinging the control, vane 23 enables the subframe 5 to move relative to the main frame 4.

The propulsion mechanism 2 has the ducted fan 21L arranged on the left of the main frame 4 (on the left of a pilot), the ducted fan 21R arranged on the right of the main frame 4 (on the right of the pilot), and the subframe 5 coupling the ducted fans 21L, 21R together. Each of the ducted fans 21L, 21R generally includes an approximately cylindrical duct 21a and a propeller 21b rotatably arranged in the duct 21a. A nose cone 21c is arranged in the front (upstream side) of a central portion of the propeller 21b. A tail cone old is arranged in the rear (downstream side) of the central portion of the propeller 21b. The nose cone 21c has a function to smoothly guide gas sacked by the propeller 21b through the duct 21a. The tail cone old has a function to straighten gas discharged from the duct 21a.

Furthermore, as shown in FIG. 1A and FIG. 1B, the swing shaft 22 and the control vane 23 are disposed on an inner side (main frame 4 side) of an annular channel formed in each of the ducted fans 21L, 21R. The swing shaft 22 is passed between the duct 21a and tail cone 21d of each of the ducted fans 21L, 21R and is disposed such that the axial direction of the swing shaft 22 is aligned with at direction perpendicular to the front-back direction of the vertical take-off and landing aircraft 1 (that is, the axial direction is aligned with a horizontal direction). The swing shaft 22 is supported at one end thereof by a bearing portion 21a formed in the duct 21a so that the swing shaft 22 is swingable. The swing shaft 22 is connected at the other end thereof to an actuator 22a arranged in the tail cone 21d. Additionally, the swing shaft 22 is arranged in a central portion of each of the ducted fans 21L, 21R in a front-back direction (on a segment joining to the axis of rotation of each of the ducted fans 21L, 21R) (the swing shafts thus arranged are hereinafter referred to as "central swing shafts").

The control vane 23 is connected to the swing shaft 22. Thus, actuating the actuator 22a allows the swing shaft 22 to swing around the axis thereof and allows the control vane 23 to swing back and forth. A speed reducer may be interposed between the actuator 22a and the swing shaft 22. In FIG. 1B, for convenience of description, the propeller 21b, the nose cone 21c, and the tail cone 21d are shown by dashed lines.

Furthermore, the aforementioned swing shaft 22 and control vane 23 may be arranged on an outer side (atmospheric side) of the annular channel formed on each of the ducted fans 21L, 21R rather than on the inner side (main frame 4 side) of the annular channel, though this is not shown in the drawings. The two swing shafts 22 arranged in the respective ducted fans 21L, 21R may individually have the actuator 22a or may share the actuator 22a via a power transmission mechanism such as a bevel gear. When the ducted fans 21L, 21R individually have the actuator 22a arranged therein, the swinging angles of the left and right control vanes 23 are changed depending on the attitude of the vertical take-off and landing aircraft 1 to enable restraint of twisting of the subframe 5.

The motive power supply means 3 is an engine that supplies motive power to the ducted fans 21L, 21R via the power transmission mechanism shown in FIG. 1C. As a motive power source, instead of the engine, an electric motor, a reciprocating engine, or the like may be used or a supercharger may be installed. The motive power supply means 3 is fixed to a rear surface of the main frame 4. The motive power supply means 3, supplied with fuel from an oil tank 31 arranged at an upper portion of the fuselage, combusts the fuel to output motive power and discharges exhaust gas through an exhaust nozzle 32 arranged in the rear of the motive power supply means 3. In FIG. 1C, for convenience of description, illustration of the swing shaft 22 and the control vane 23 is omitted.

As shown in FIG. 1C, the power transmission mechanism of the vertical take-off and landing aircraft 1 has the motive power supply means 3, a sprocket 33 connected to a tip of art output shaft of the motive power supply means 3, a power transmission shaft 34 having bevel gears 34a at opposite ends thereof and a sprocket 34b in a middle portion thereof, a roller chain passed between sprockets 33, 34b, and a bearing 35 that supports the power transmission shaft 34 so that the power transmission shaft 34 is rotatable. Power output by the motive power supply means 3 is transmitted to the power transmission shaft 34 via a chain driving mechanism. Rotation of the power transmission shaft 34 is transmitted to driving shafts of the ducted fans 21L, 21R via the bevel gears 34a.

Power transmission from the motive power supply means 3 to the power transmission shaft 34 is not limited to the chain driving mechanism but may be performed by a belt driving mechanism or a gear driving mechanism or via a speed reducer or a speed increaser. Furthermore, when the rotating speeds of the ducted fans 21L, 21R are to be individually controlled, the ducted fans 21L, 21R may connect individually to the motive power supply means 3. The bearing 35 supporting the power transmission shaft 34 is arranged on the main frame 4 to which the motive power supply means 3 is fixed, thus preventing a fluctuation in the positional relation between the output shaft of the motive power supply means 3 and the power transmission shaft 34.

The main frame 4 is a member forming the framework of the fuselage and is a component that supports the propulsion mechanism 2, the motive power supply means 3, the seating 41, the landing undercarriage 42, and the like. The main frame 4 preferably has a frame structure in order to reduce the weight of the fuselage. The following are arranged below the main frame 4: the seating 41 in which a passenger sits (for example, front seating and rear seating), a plurality of the landing undercarriages 42 providing leg sections that come into contact with the ground or the like at the time of landing, a tail wing 43 that stabilizes the moment and balance of the fuselage, a foot rest 44 that supports the passenger's feet, and the like. A seat belt may be arranged at the seating 41, and a damper may be arranged in the landing undercarriage 42.

Furthermore, a cowl 45 serving as a flow controlling means is arranged in front of and connected to the seating 41. A part of the cowl 45 is formed of a transparent member in order to ensure visibility, and a back mirror may be arranged on a side surface portion of the cowl 45. Furthermore, a junction 46 between the seating 41 and the cowl 45 may be used as a console box or as a control section in which operating switches or levers for the motive power supply means 3 are arranged.

Furthermore, the main body of the motive power supply means 3 is fixed to the rear surface of the main frame 4. The oil tank 31 is fixed to an upper portion (ceiling portion) of the main frame 4. Additionally, a plate material providing a roof section that avoids exposure to rain may be arranged at the ceiling portion of the main frame 4.

The subframe 5 is a component that connects the left and right ducted fans 21L, 21R together. Furthermore, the subframe 5 connects to the control stick 6 extending in front of the seating 41. The control stick 6 extends from the subframe 5 to the front of the seating 41. The control stick 6 is swung back and forth to swing the subframe 5 back and forth relative to the main frame 4. The control stick 6 is used to swing the subframe 5 and the propulsion mechanism 2, and may thus be connected to an outer peripheral surface of the propulsion mechanism 2. As shown in FIG. 1C, the subframe 5 is connected to the main frame 4 via a frame coupling section 51 so as to be swingable.

Such a frame structure is used to fix the seating 41 and the motive power supply means 3 to the main frame 4, and thus, these components are integrated together so as not to move relative to one another. On the other hand, since the propulsion mechanism 2 (ducted fans 21L, 21R) is fixed to the subframe 5, the propulsion mechanism 2 (ducted fans 21L, 21R) can be moved (swung) relative to the seating 41 and the motive power supply means 3 by connecting the subframe 5 to the main frame 4 so that the subframe 5 is swingable.

The frame coupling section 51 is configured such that the axis of rotation of the power transmission shaft 34 is arranged coaxially with the swing shaft of the subframe 5. Furthermore, the frame coupling section 51 has, for example, a main body portion 51a having a first cylindrical portion connected to a lower surface of the main frame 4 and through which the power transmission shaft 34 can be inserted, a swinging section 51b having a second cylindrical portion connected to the lower surface of the subframe 5 and inserted and fitted into the first cylindrical portion, and a bearing (not shown in the drawings) arranged between the first cylindrical portion and the second cylindrical portion. In such a configuration, with a connection state maintained at the junction (bevel gear 34a) between the power transmission shaft 34 and each of the ducted fans 21L, 21R, the ducted fans 21L, 21R can be swung along the axis of rotation of the power transmission shaft 34 to allow the direction of the propulsion mechanism 2 to be changed. The frame coupling section 51 may allow the main frame 4 and the subframe 5 to move (swing) relative to each other, and is not limited to the illustrated configuration.

As described above, the subframe 5 with the propulsion mechanism 2 is configured so as to be swingable relative to the main frame 4 forming the framework of the fuselage. The control stick 6 is manipulated so as to swing around the axis of the power transmission shaft 34 to allow the propulsion mechanism 2 (ducted fans 21L, 21R) to swing (tilt) back and forth. Thus, the flying direction of the fuselage and the like can be controlled. In this regard, since the motive power supply means 3 is fixed to the main frame 4, the weight of the subframe 5 can be reduced, but a force that resists being overwhelmed by thrust or lift is needed to swing the subframe 5 during operation of the propulsion mechanism 2 (ducted fans 21L, 21R). In the present invention, the control vane 23 is arranged in order to reduce the force needed to move (swing) the subframe 5 relative to the main frame 4.

The aforementioned motive power supply means 3 may be arranged in the subframe 5 rather than in the main frame 4, though this is not shown in the drawings. In this case, the axis of rotation of the power transmission shaft 34 need not be arranged coaxially with the swing shaft of the subframe 5. This allows the power transmission mechanism to be simplified, but on the other hand, increases the weight of the subframe 5, leading to the need for a strong force for manipulation (swinging) of the subframe 5. However, the arrangement of the aforementioned control vane 23 enables a reduction in the force needed to move (swing) the subframe 5 relative to the main frame 4.

Figure 2A:
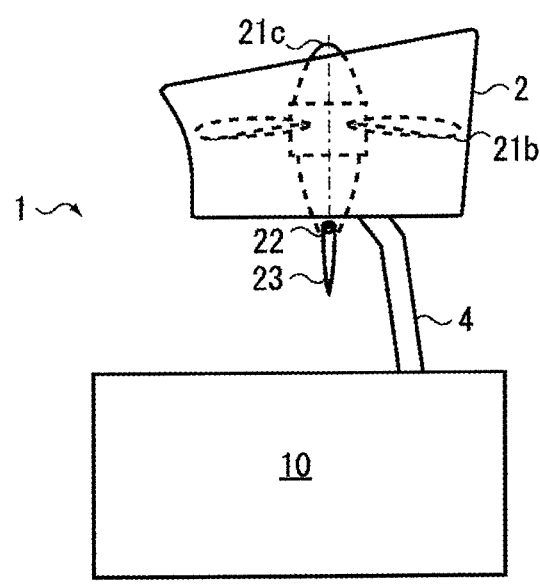
FIG. 2A is a diagram showing an effect of the vertical take-off and landing aircraft according to the first embodiment of the present invention and illustrating a rising state.
Figure 2B:
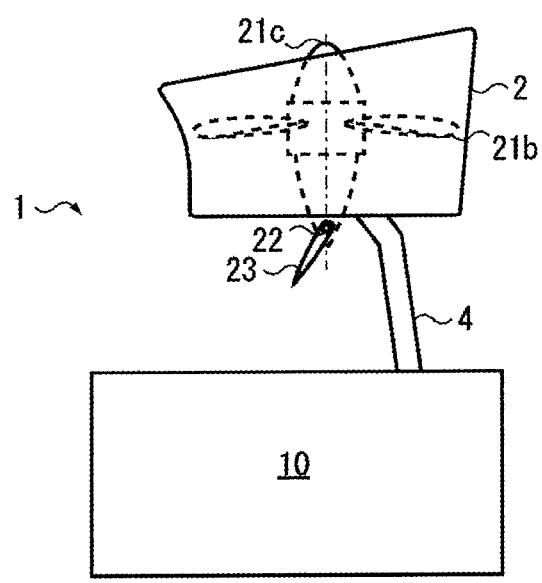
FIG. 2B is a diagram showing the effect of the vertical take-off and landing aircraft according to the first embodiment of the present invention and illustrating a control vane forward swinging state.
Figure 2C:
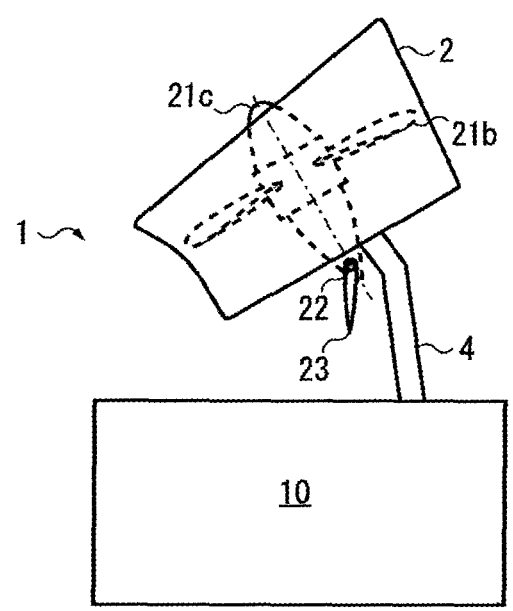
FIG. 2C is a diagram showing the effect of the vertical take-off and landing aircraft according to the first embodiment of the present invention and illustrating a subframe swinging state.
Figure 2D:
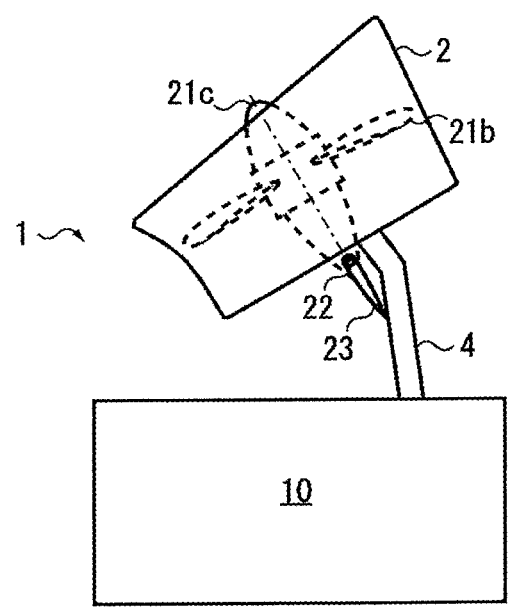
FIG. 2D is a diagram showing the effect of the vertical take-off and landing aircraft according to the first embodiment of the present invention and illustrating a forward flying state.
Figure 2E:
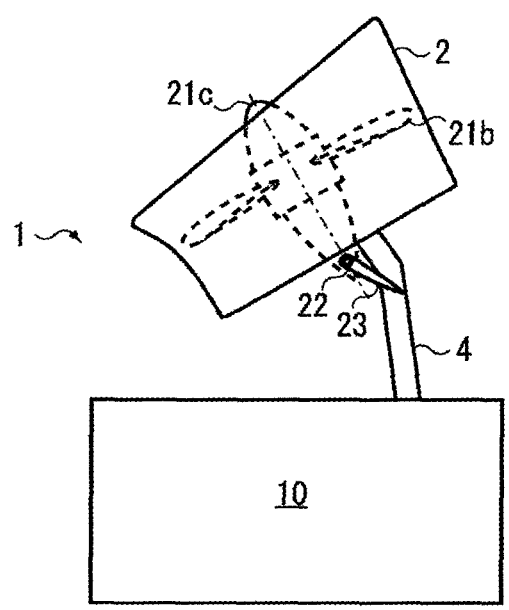
FIG. 2E is a diagram showing the effect of the vertical take-off and landing aircraft according to the first embodiment of the present invention and illustrating a control vane backward swinging state.
Figure 2F:
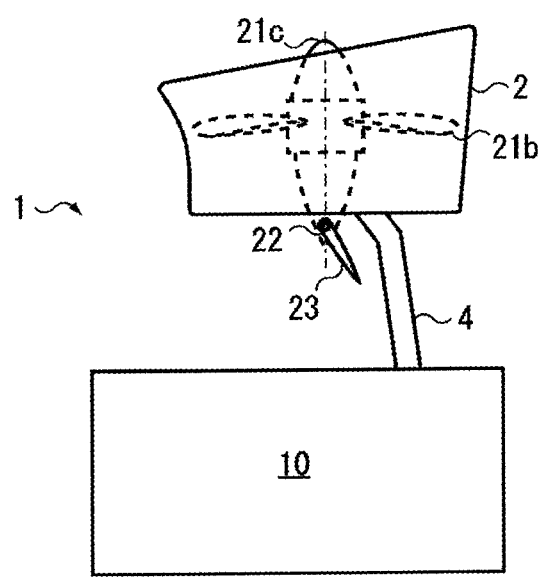
FIG. 2F is a diagram showing the effect of the vertical take-off and landing aircraft according to the first embodiment of the present invention and illustrating a subframe swinging state.
Figure 3A:
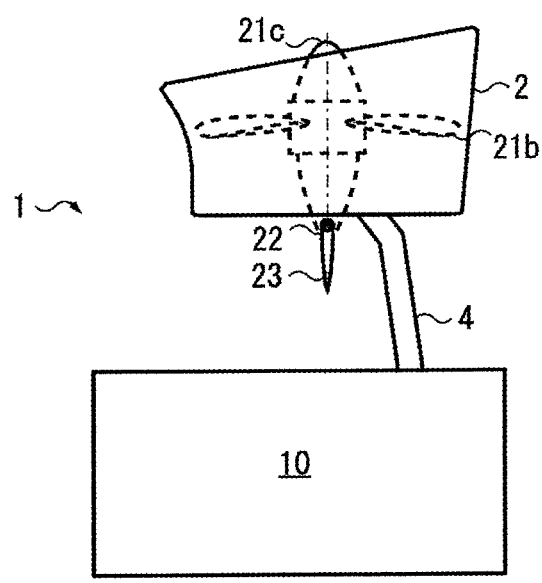
FIG. 3A is a diagram showing another effect of the vertical take-off and landing aircraft according to the first embodiment of the present invention and illustrating a hovering state.
Figure 3B:
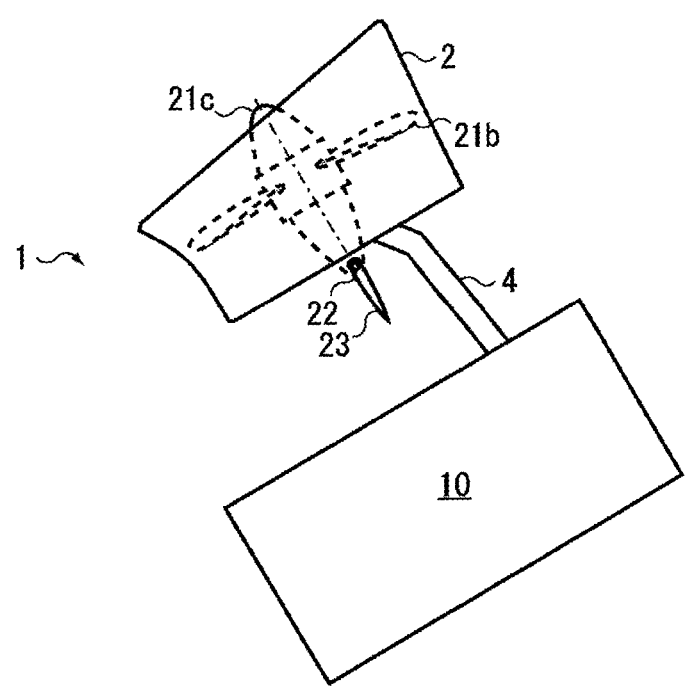
FIG. 3B is a diagram showing the effect of the vertical take-off and landing aircraft according to the first embodiment of the present invention and illustrating a fuselage tilting state.
Figure 3C:
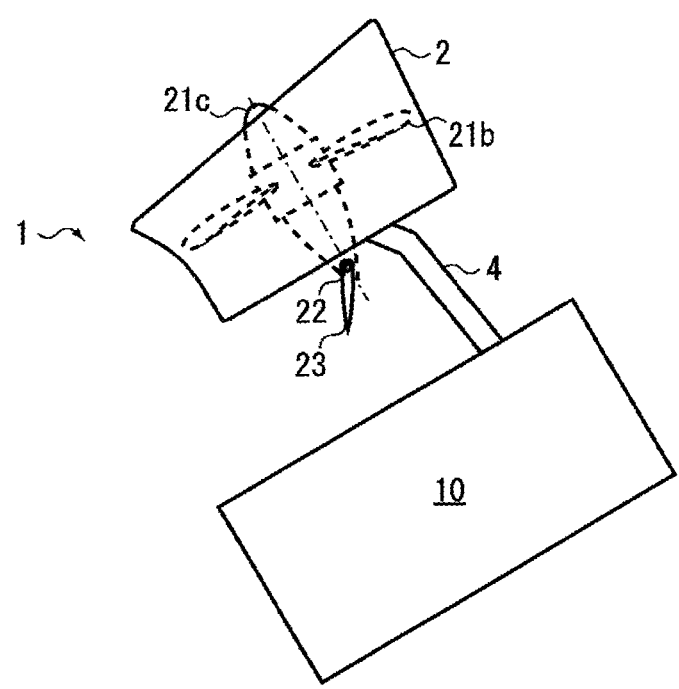
FIG. 3C is a diagram showing the effect of the vertical take-off and landing aircraft according to the first embodiment of the present invention and illustrating a control vane forward swinging state.
Figure 3D:
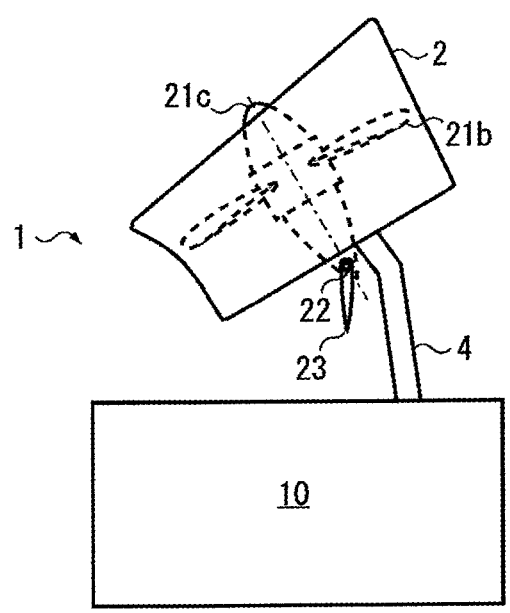
FIG. 3D is a diagram showing the effect of the vertical take-off and landing aircraft according to the first embodiment of the present invention and illustrating a main frame swinging state.
Figure 3E:
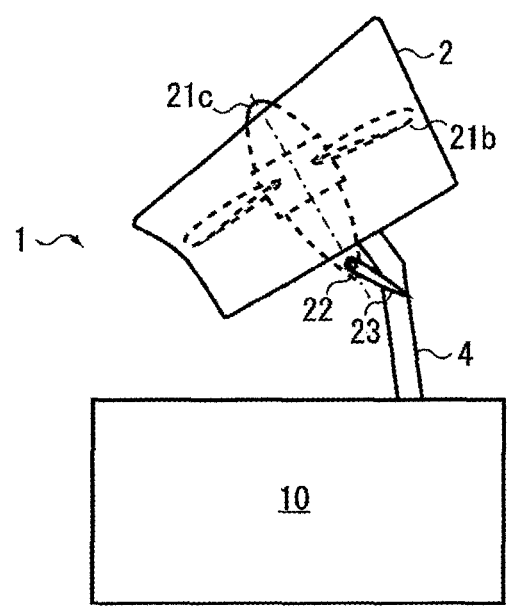
FIG. 3E is a diagram showing the effect of the vertical take-off and landing aircraft according to the first embodiment of the present invention and illustrating a control vane backward swinging state.
Figure 3F:
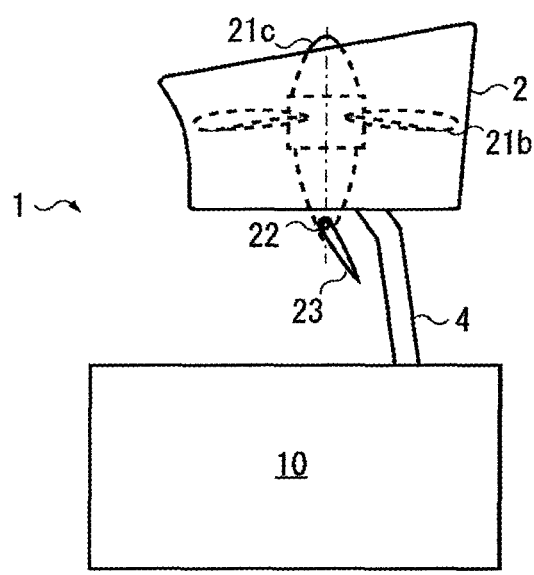
FIG. 3F is a diagram showing the effect of the vertical take-off and landing aircraft according to the first embodiment of the present invention and illustrating a subframe swinging state.

Now, operations of the control vane 23 will be described with reference to FIGS. 2A to 3F. FIGS. 2A to 2F are diagrams showing an effect of the vertical take-off and landing aircraft according to the first embodiment. FIG. 2A illustrates a rising state, FIG. 2B illustrates a control vane forward swinging state, and FIG. 2C illustrates a subframe swinging state. FIG. 2D illustrates a forward flying state, FIG. 2E illustrates a control vane backward swinging state, and FIG. 2F illustrates a subframe swinging state. FIGS. 3A to 3F are diagrams showing another effect of the vertical take-off and landing aircraft according to the first embodiment. FIG. 3A illustrates a hovering state, FIG. 3B illustrates a fuselage tilting state, and FIG. 3C is a control vane forward swinging state. FIG. 3D illustrates a main frame swinging state, FIG. 3E illustrates a control vane backward swinging state, and FIG. 3F illustrates a subframe swinging state. In the figures, for convenience of description, the fuselage main body of the vertical take-off and landing aircraft 1 is illustrated in a simplified manner by reference sign 10, and illustration of the control stick 6 and the bearing portion 21e is omitted.

FIGS. 2A to 2D show operations of shifting the vertical take-off and landing aircraft 1 from the rising state to the forward flying state. FIG. 2A shows the rising state of the vertical take-off and landing aircraft 1. In the rising state, the propulsion mechanism 2 is oriented in a vertical direction and sucks air from above and ejects the air downward to allow the fuselage main body 10 to rise or float. At this time, the control vane 23 is held so as to face straight down so as not to hinder airflow through the propulsion mechanism 2.

When the vertical take-off and landing aircraft 1 is to be propelled forward, the propulsion mechanism 2 needs to be tilted forward to eject air backward to allow thrust to be exerted. Such a manipulation is basically performed using the control stick 6. However, the present embodiment utilizes the lift of the control vane 23 in order to reduce the force needed for the manipulation. First, when the control vane 23 is swung forward as shown in FIG. 2B, air having passed through the propeller 21b impinges against a front surface of the control vane 23, and the control vane 23 generates lift backward.

As a result, the propulsion mechanism 2 (subframe 5) moves relative to the fuselage main body 10 (main frame 4) to swing so that the head (nose cone 21c side) of the propulsion mechanism 2 faces forward, as shown in FIG. 2C. Thus, mere swinging of the control vane 23 allows the propulsion mechanism 2 to swing in the predetermined direction. This enables a reduction in the force needed to manipulate the control stick 6, allowing maneuver to be supported.

Finally, as shown in FIG. 2D, with the propulsion mechanism 2 kept tilted, the control vane 23 is swung so as to be tilted at the same angle at which the propulsion mechanism 2 is tilted. Then, air can be ejected backward from the propulsion mechanism 2, allowing stable thrust to be exerted.

Then, to return from the forward flying state to the rising state or floating state, the control vane 23 is swung backward with the propulsion mechanism 2 tilted as shown, in FIG. 2E. At this time, air having passed through the propeller 21*b* impinges against a rear surface of the control vane 23, and the control vane 23 generates lift forward.

As a result, the propulsion mechanism 2 (subframe 5) moves relative to the fuselage main body 10 (main frame 4) to swing so that the head (nose cone 21*c* side) of the propulsion mechanism 2 faces upward, as shown in FIG. 2F. Thus, mere swinging of the control vane 23 allows the propulsion mechanism 2 to swing in the predetermined direction. This enables a reduction in the force needed to manipulate the control stick 6, allowing maneuver to be supported.

The aforementioned swing of the control vane 23 is manipulated by the actuator 22*a* shown in FIG. 1A. Driving of the actuator 22*a* is controlled using operating buttons and levers (not shown in the drawings) arranged at the seating 41 or the control stick 6.

FIGS. 3A to 3F show operations performed to recover the vertical take-off and landing aircraft 1 to the hovering state when the vertical take-off and landing aircraft 1 in the hovering state is thrown off balance by disturbance such as a blast of a gust of wind. FIG. 3A shows the hovering state of the vertical take-off and landing aircraft 1. In the hovering state, the propulsion mechanism 2 is oriented in the vertical direction, and sucks air from above and ejects the air downward to bring gravity and lift generated in the fuselage main body 10 into balance. At this time, the control vane 23 is held so as to face straight down so as not to hinder airflow through the propulsion mechanism 2.

When the vertical take-off and landing aircraft 1 in the hovering state is subjected to disturbance such as a gust of wind, the vertical take-off and landing aircraft 1 as a whole may be tilted forward with the positional relations among the propulsion mechanism 2, the fuselage main body 10, and the control vans 23 maintained, for example, as shown in FIG. 3B. To recover the vertical take-off and landing aircraft 1 from the tilted state to the hovering state, first, the control vane 23 is swung forward as shown in FIG. 3C. At this time, air having passed through the propeller 21*b* impinges against the front surface of the control vane 23, and the control vane 23 generates lift backward.

Thus, the propulsion mechanism 2 (subframe 5) operates to move relative to the fuselage main body 10 (main frame 4), but since the fuselage main body 10 has been thrown off balance to displace the center of gravity thereof, the fuselage main body 10 (main frame 4) moves relative to the propulsion mechanism 2 (subframe 5) as shown in FIG. 3D. This operation is synonymous with movement of the propulsion mechanism 2 (subframe 5) relative to the fuselage main body 10 (main frame 4).

In the state shown in FIG. 3D, the attitude of the fuselage main body 10 has returned to the normal state. However, since the propulsion mechanism 2 is tilted forward, the vertical take-off and landing aircraft 1 fails to maintain the hovering state and operates to fly forward. Thus, a manipulation for recovering the attitude of the propulsion mechanism 2 to the normal state is then performed.

As shown in FIG. 3E, with the propulsion mechanism 2 tilted, the control vane 23 is swung backward. At this time, air having passed through the propeller 21*b* impinges against the rear surface of the control vane 23, and the control vane 23 generates lift forward. As a result, the propulsion mechanism 2 (subframe 5) moves relative to the fuselage main body 10 to swing so that the head (nose cone 21*c* side) of the propulsion mechanism 2 faces upward, as shown in FIG. 3F.

Finally, the control vane 23 is swung so as to establish the state shown in FIG. 3A to allow the vertical take-off and landing aircraft 1 to recover to the hovering state. The aforementioned swing of the control vane 23 is manipulated by the actuator 22*a* shown in FIG. 1A. Driving of the actuator 22*a* may be controlled using operating buttons and levers (not shown in the drawings) arranged at the seating 41 or the control stick 6. Furthermore, a sensor such as a gyroscope which detects a tilt of the attitude of the fuselage main body 10 may be arranged such that, when the fuselage main body 10 is tilted, the actuator 22*a* is automatically manipulated to control the swing of the control vane 23.

Figure 4A:
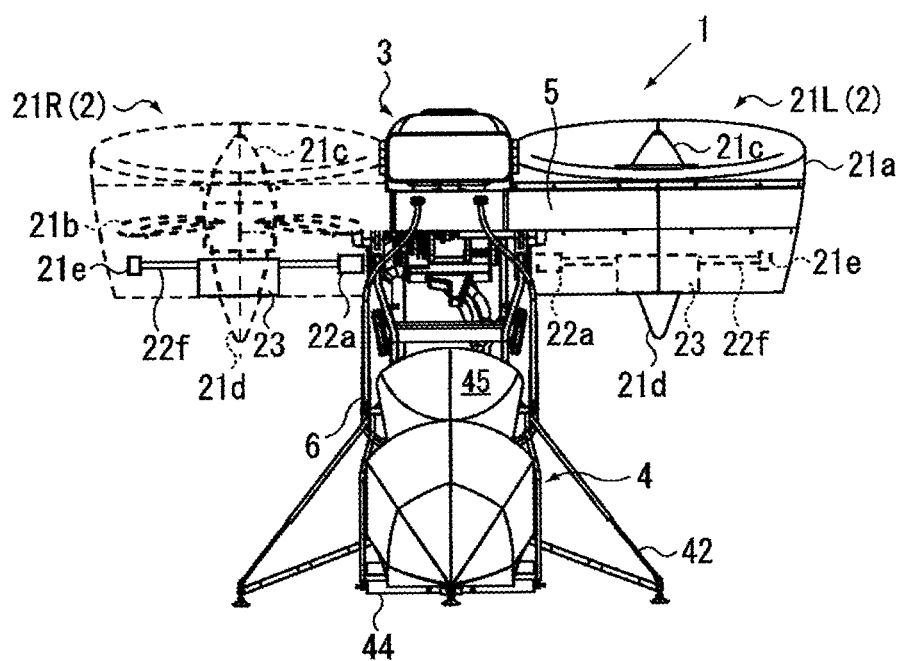
FIG. 4A is a front view showing a vertical take-off and landing aircraft according to a second embodiment of the present invention.
Figure 4B:
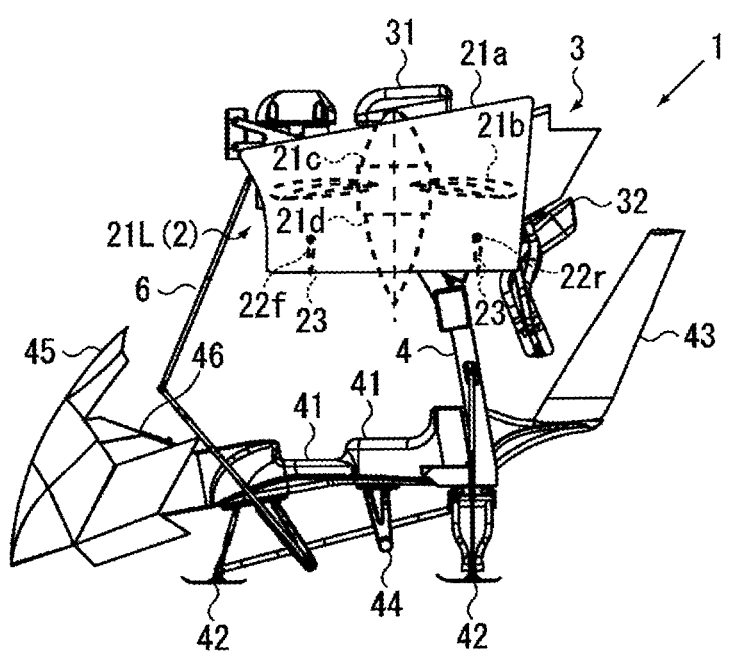
FIG. 4B is a side view showing the vertical take-off and landing aircraft according to the second embodiment of the present invention.
Figure 5A:
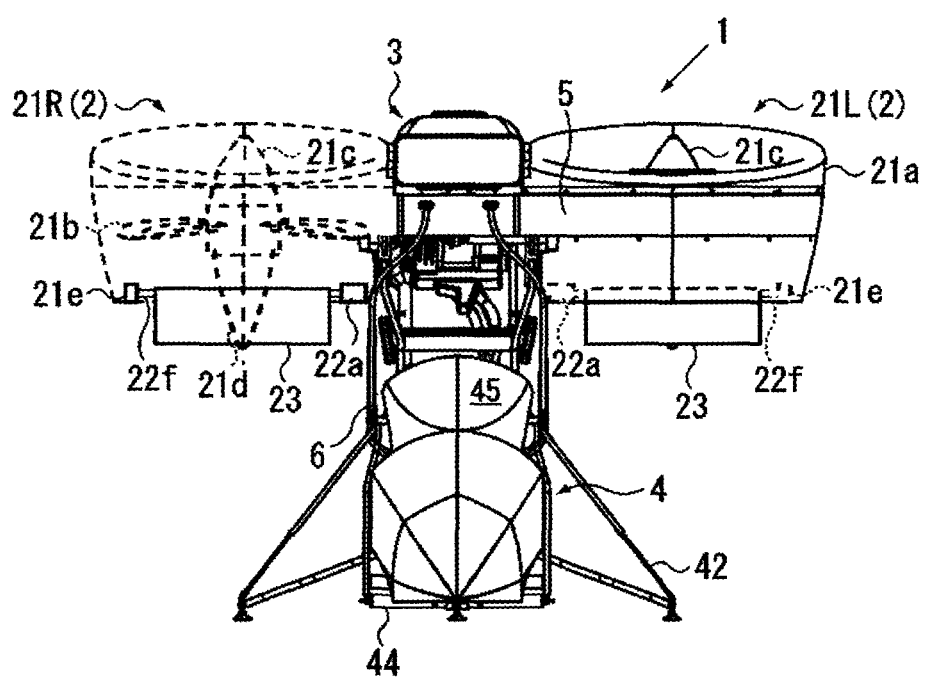
FIG. 5A is a front view showing a vertical take-off and landing aircraft according to a third embodiment of the present invention.
Figure 5B:
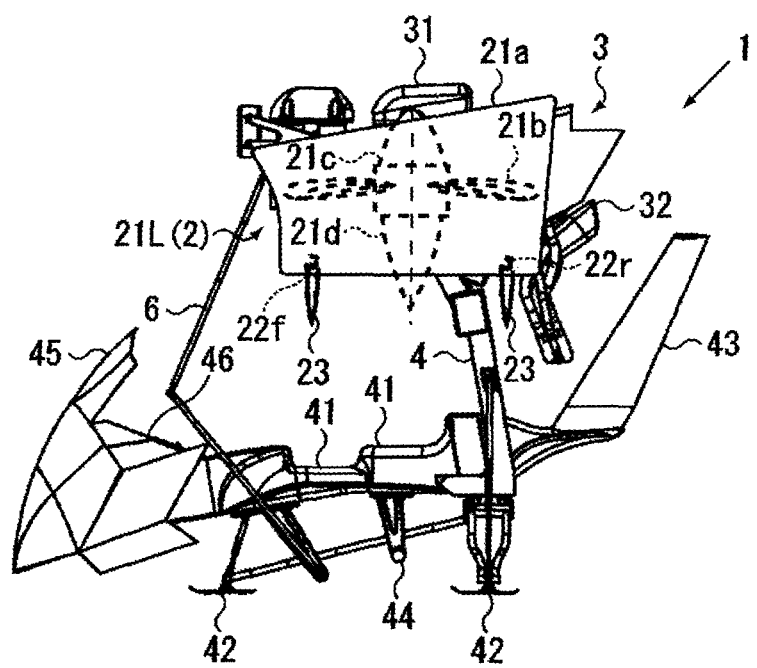
FIG. 5B is a side view showing the vertical take-off and landing aircraft according to the third embodiment of the present invention.
Figure 6A:
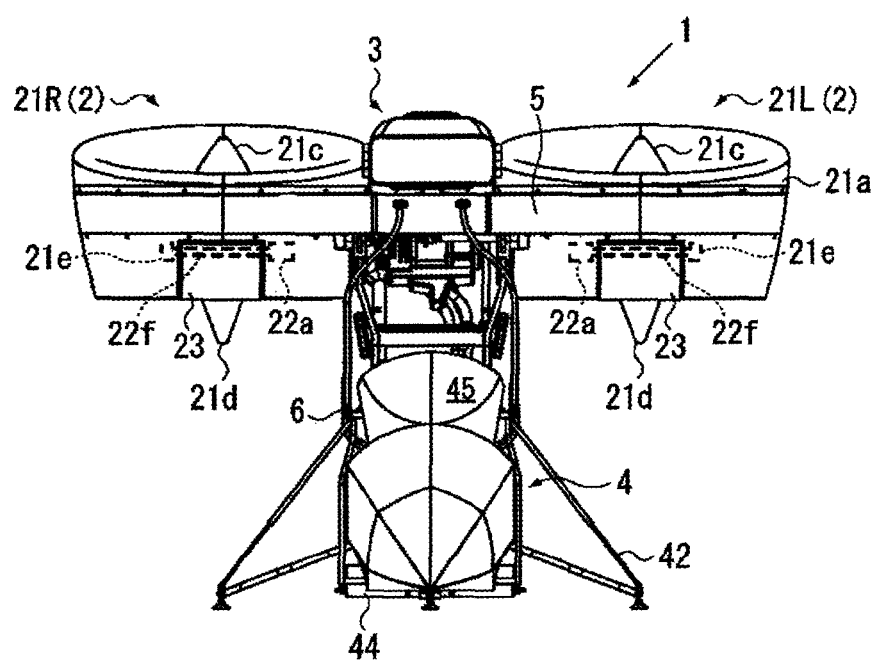
FIG. 6A is a front view showing a vertical take-off and landing aircraft according to a fourth embodiment of the present invention.
Figure 6B:
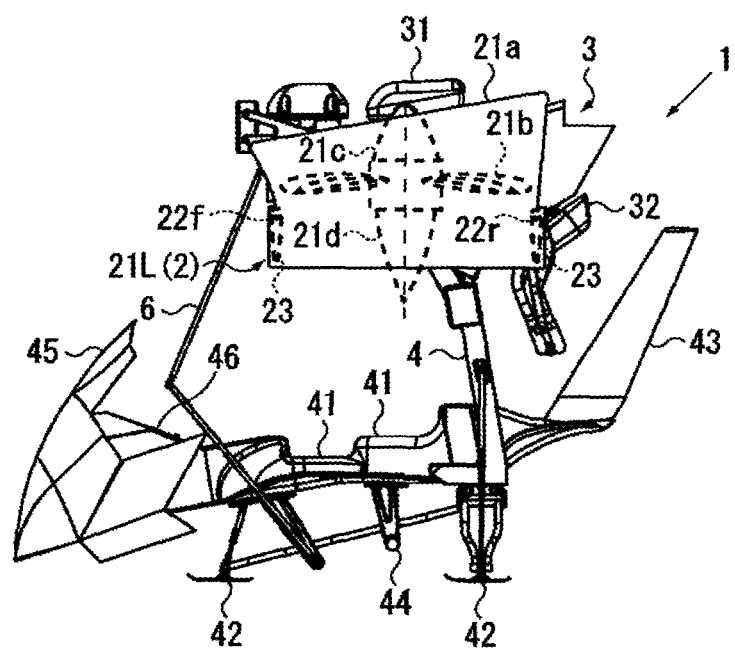
FIG. 6B is a side view showing the vertical take-off and landing aircraft according to the fourth embodiment of the present invention.
Figure 7A:
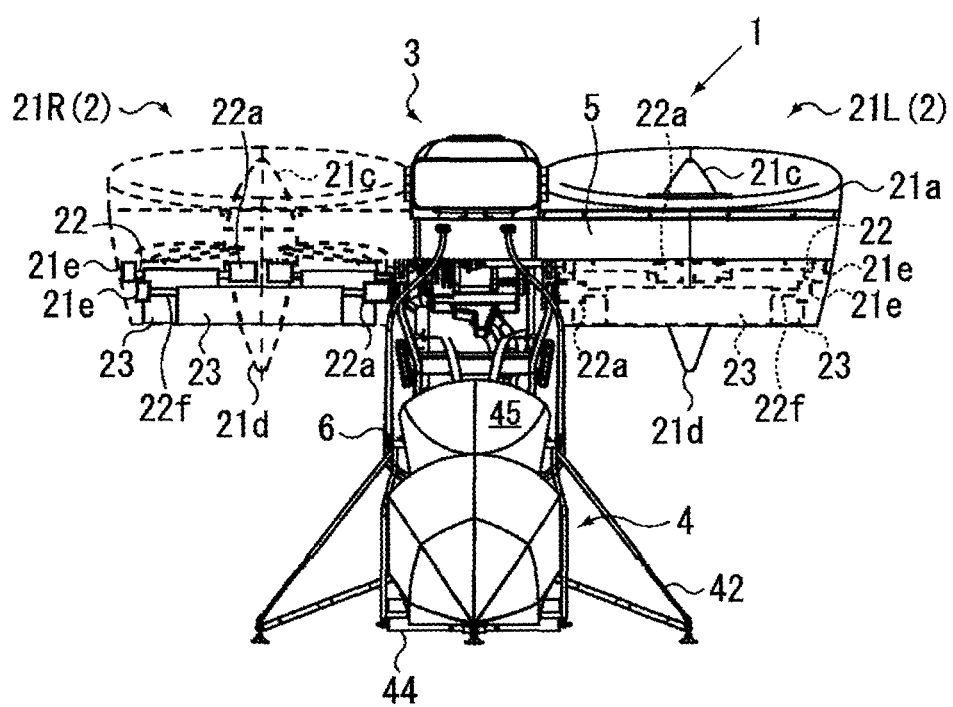
FIG. 7A is a front view showing a vertical take-off and landing aircraft according to a fifth embodiment of the present invention.
Figure 7B:
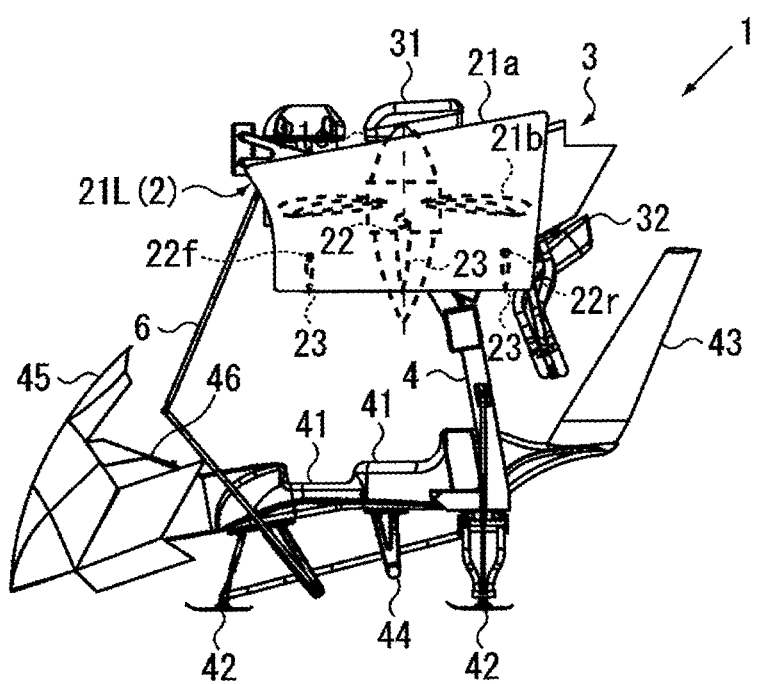
FIG. 7B is a side view showing the vertical take-off and landing aircraft according to the fifth embodiment of the present invention.

Now, vertical take-off and landing aircrafts according to other embodiments of the present invention will be described with reference to FIGS. 4A to 7B. FIG. 4A and FIG. 4B are diagrams showing a vertical take-off and landing aircraft according to a second embodiment of the present invention. FIG. 4A is a front view, and FIG. 4B is a side view. FIG. 5A and FIG. 5B are diagrams showing a vertical take-off and landing aircraft according to a third embodiment of the present invention. FIG. 5A is a front view, and FIG. 5B is a side view. FIG. 6A and FIG. 6B are diagrams showing a vertical take-off and landing aircraft according to a fourth embodiment of the present invention. FIG. 6A is a front view, and FIG. 6B is a side view. FIG. 7A and FIG. 7B are diagrams showing a vertical take-off and landing aircraft according to a fifth embodiment of the present invention. FIG. 7A is a front view, and FIG. 7B is a side view. In the figures, the same components as those of the vertical take-off and landing aircraft 1 according to the aforementioned first embodiment are denoted by the same reference signs and duplicate descriptions are omitted.

The vertical take-off and landing aircraft 1 according to the second embodiment shown in FIG. 4A and FIG. 4B has a front swing shaft 22*f* arranged at the front in a channel in each of the ducted fans 21L, 21R and a rear swing shaft 22*r* arranged at the back in the channel in each of the ducted fans 21L, 21R. The control vane 23 is connected to the front swing shaft 22*f* and to the rear swing shaft 22*r* as is the case with the first embodiment. The swing shafts such as the front swing shaft 22*f* and the rear swing shaft 22*r* which are arranged in front of and behind the nose cons 21*c* or the tail cone 21*d* are hereinafter referred to as "side swing shafts". In the illustrated second embodiment, the side swing shafts (front swing shaft 22*f* and rear swing shaft 22*r*) are arranged at positions that allow the control vane 23 to lie within the channel of the duct 21*a*. The bearing portion 21*e* and the actuator 22*a* for each of the front and rear swing shafts 22*f* and 22*r* are arranged in the housing or the duct 21*a*, In FIG. 4A, for convenience of description, the ducted fan 21R is shown by a dotted line.

In the vertical take-off and landing aircraft 1 according to the second embodiment as described above, the control vane 23 is connected to the side swing shaft instead of the central swing shaft in the first embodiment. A method for manipulating the control vane 23 according to the second embodiment is, for example, substantially identical to the method for the control vane 23 in the first embodiment shown in FIGS. 2A to 2F and FIGS. 3A to 3F, and will not be described below in detail.

In the vertical take-off and landing aircraft 1 according to the third embodiment shown in FIG. 5A and FIG. 5B, the control vane 23 in the aforementioned second embodiment is arranged under the duct 21a. When arranged outside the channel in the duct 21a as described above, the control vane 23 can be formed to have a large surface area and can have improved responsiveness. In FIG. 5A, for convenience of description, the ducted fan 21R is shown by a dotted line.

In the vertical take-off and landing aircraft 1 according to the fourth embodiment shown in FIG. 6A and FIG. 6B, the side swing shaft (front swing shaft 22f and rear swing shaft 22r) is arranged in a part of the housing of the duct 21a. A front surface portion and a rear surface portion of the housing of the duct 21a are partly cut out so as to be shaped to enable the control vane 23 to be inserted into the housing. In such a configuration, the control vane 23 is not always arranged in the channel in the propulsion mechanism 2. Thus, disturbance of airflow and a pressure loss can be reduced while the control vane 23 is cut of use. Furthermore, air can be passed from an inner surface of the duct 21a along the surface of the control vane 23, allowing lift to be efficiently generated.

In the vertical take-off and landing aircraft 1 according to the fifth embodiment shown in FIG. 7A and FIG. 7B, both the aforementioned central swing shaft (swing shaft 22) and side swing shaft (front swing shaft 22f and rear swing shaft 22r) are arranged in the propulsion mechanism 2. The control vanes 23 connected to the central swing shaft and the side swing shaft are manipulated as in the aforementioned other embodiments to allow the attitude of the vertical take-off and landing aircraft 1 to be controlled. Furthermore, when the central swing shaft and the side swing shaft are provided as described above, the control vane 23 connected to the central swing shaft (swing shaft 22) may be used to deflect the thrust of each of the ducted fans 21L, 21R, whereas the control vane 23 connected to the side swing shaft (front swing shaft 22f and rear swing shaft 22r) may be used to tilt the subframe 5. The Control vanes 23 may be arranged within the duct 21a or so as to stick out from the duct 21a.

Figure 8A:
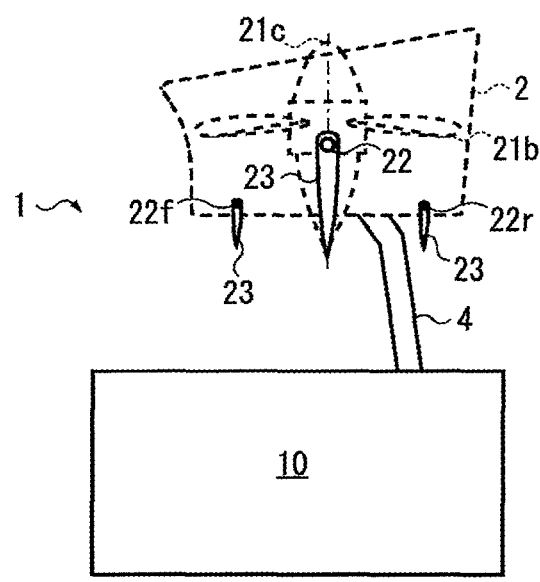
FIG. 8A is a diagram showing an effect of the vertical take-off and landing aircraft according to the fifth embodiment of the present invention and illustrating a rising state.
Figure 8B:
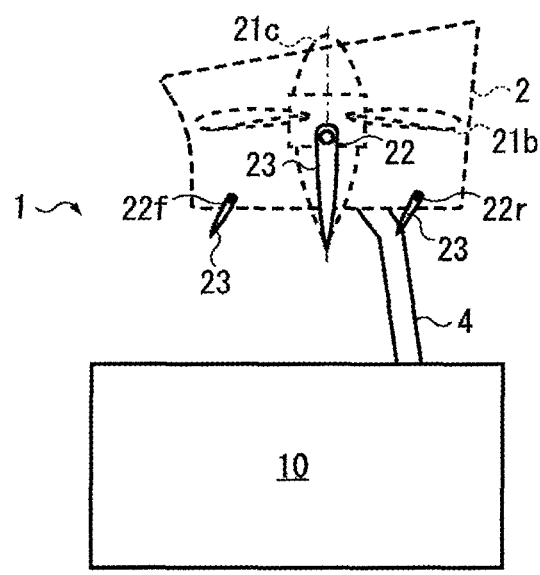
FIG. 8B is a diagram showing the effect of the vertical take-off and landing aircraft according to the fifth embodiment of the present invention and illustrating a control vane forward swinging state.
Figure 8C:
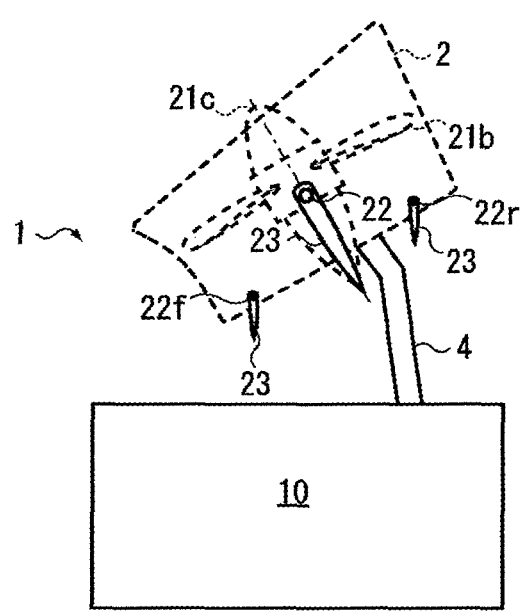
FIG. 8C is a diagram showing the effect of the vertical take-off and landing aircraft according to the fifth embodiment of the present invention and illustrating a subframe swinging state.
Figure 8D:
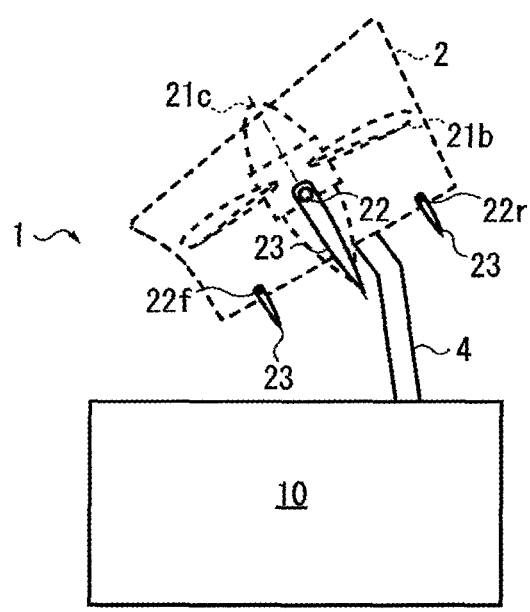
FIG. 8D is a diagram showing the effect of the vertical take-off and landing aircraft according to the fifth embodiment of the present invention and illustrating a forward flying state.
Figure 9A:
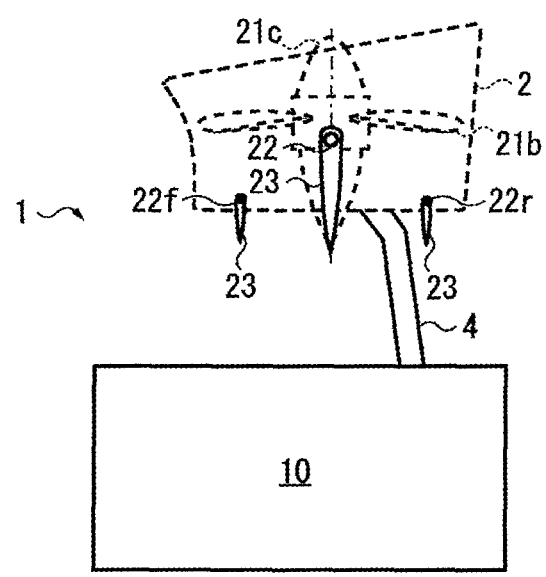
FIG. 9A is a diagram showing another effect of the vertical take-off and landing aircraft according to the fifth embodiment of the present invention and illustrating a hovering state.
Figure 9B:
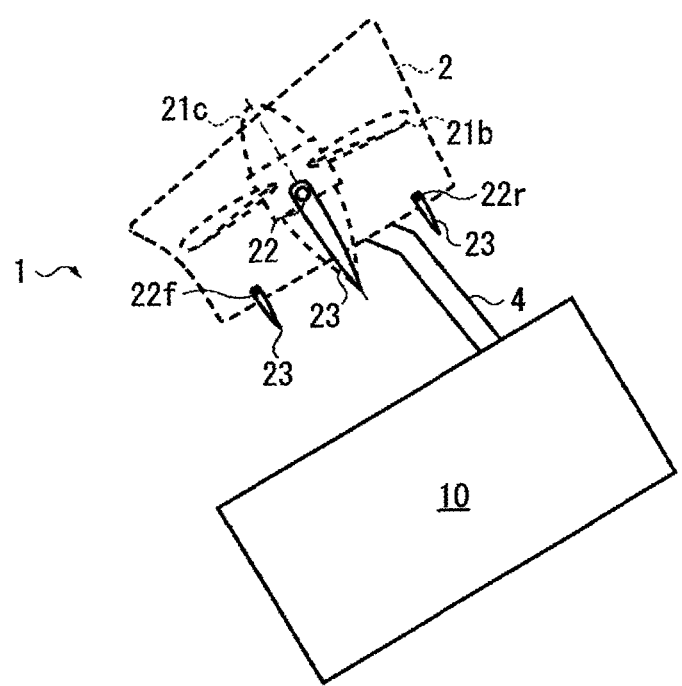
FIG. 9B is a diagram showing the effect of the vertical take-off and landing aircraft according to the fifth embodiment of the present invention and illustrating a fuselage tilting state.
Figure 9C:
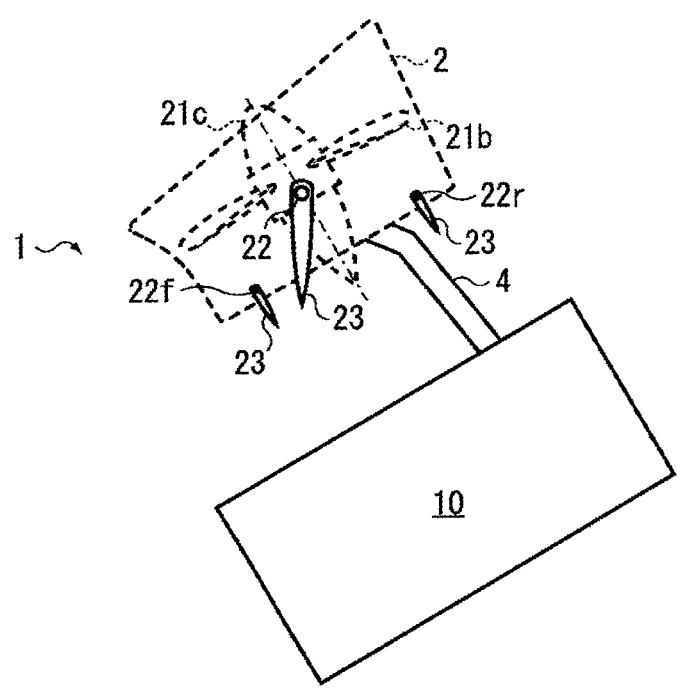
FIG. 9C is a diagram showing the effect of the vertical take-off and landing aircraft according to the fifth embodiment of the present invention and illustrating a thrust-deflecting control vane swinging state.
Figure 9D:
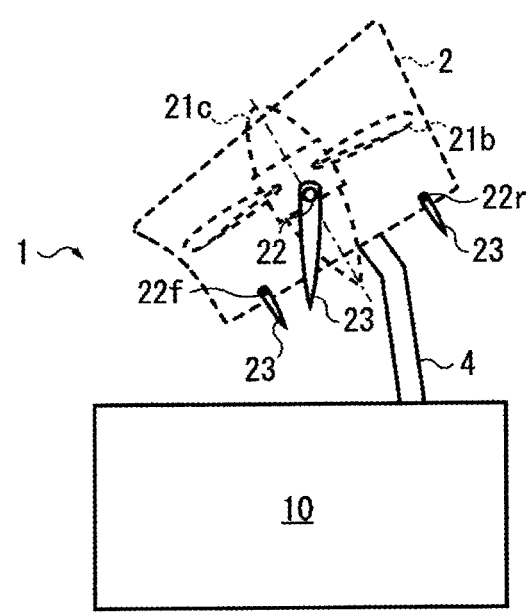
FIG. 9D is a diagram showing the effect of the vertical take-off and landing aircraft according to the fifth embodiment of the present invention and illustrating a main frame swinging state.
Figure 9E:
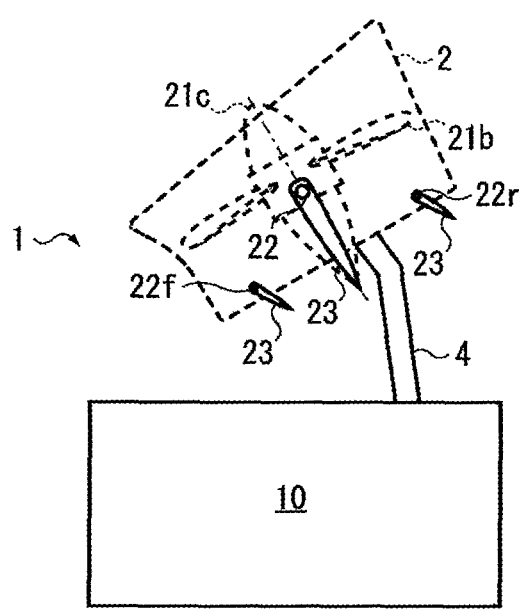
FIG. 9E is a diagram showing the effect of the vertical take-off and landing aircraft according to the fifth embodiment of the present invention and illustrating a tilting control vane swinging state.
Figure 9F:
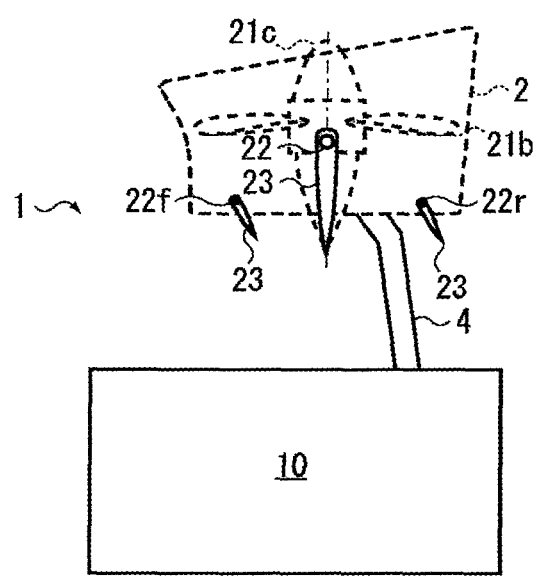
FIG. 9F is a diagram showing the effect of the vertical take-off and landing aircraft according to the fifth embodiment of the present invention and illustrating a subframe swinging state.

Now, operations of the control vane 23 according to the fifth embodiment will be described with reference to FIGS. 3A to 9F. FIGS. 6A to 3D are diagrams showing an effect of the vertical take-off and landing aircraft according to the fifth embodiment. FIG. 8A illustrates the rising state, FIG. 8B illustrates the control vane forward swinging state, FIG. 8C illustrates the subframe swinging state, and FIG. 8D illustrates the forward flying state. FIGS. 9A to 9F are diagrams showing another effect of the vertical take-off and landing aircraft according to the fifth embodiment. FIG. 9A illustrates the hovering state, FIG. 9B illustrates the fuselage tilting state, and FIG. 9C is a thrust deflecting control vane swinging state. FIG. 9D illustrates a main frame swinging state, FIG. 9E illustrates a tilting control vane swinging state, and FIG. 9F illustrates the subframe swinging state. In the figures, for convenience of description, the fuselage main body of the vertical take-off and landing aircraft 1 is illustrated in a simplified manner by reference sign 10, and illustration of the control stick 6 is omitted.

FIGS. 8A to 8D show operations of shifting the vertical take-off and lauding aircraft 1 from the rising state to the forward flying state. FIG. 8A shows the rising state of the vertical take-off and landing aircraft 1. In the rising state, the propulsion mechanism 2 is oriented in the vertical direction and sucks air from above and ejects the air downward to allow the fuselage main body 10 to rise or float. At this time, all the control vanes 23 are held so as to face straight down so as not to hinder airflow through the propulsion mechanism 2.

When the vertical take-off and landing aircraft 1 is to be propelled forward, the propulsion mechanism 2 needs to be tilted forward to eject air backward to allow thrust to be exerted. Such a manipulation is basically performed using the control stick 6. However, the present embodiment utilizes the lift of the control vane 23 connected to the side swing shaft (front swing shaft 22f and rear swing shaft 22r) in order to reduce the force needed for the manipulation. First, when the control vane 23 connected to the side swing shaft (front swing shaft 22f and rear swing shaft 22r) is swung forward as shown in FIG. 8B, air having passed through the propeller 21b impinges against the front surface of the control vane 23, and the control vane 23 generates lift backward.

As a result, the propulsion mechanism 2 (subframe 5) moves relative to the fuselage main body 10 (main frame 4) to swing so that the head (nose cone 21c side) of the propulsion mechanism 2 faces forward, as shown in FIG. 8C. Thus, mere swinging of the control vane 23 connected to the side swing shaft (front swing shaft 22f and rear swing shaft 22r) allows the propulsion mechanism 2 to swing in the predetermined direction. This enables a reduction in the force needed to manipulate the control stick 6, allowing maneuver to be supported. The control vane 23 connected to the central swing shaft (swing shaft 22) is a thrust deflecting control vane and is thus not used in this case.

Finally, as shown in FIG. 8D, with the propulsion mechanism 2 kept tilted, the control vane 23 connected to the side swing shaft (front swing shaft 22f and rear swing shaft 22r) is swung so as to be tilted at the same angle at which the propulsion mechanism 2 is tilted. Then, air can be ejected backward from the propulsion mechanism 2, allowing thrust to be exerted. A manipulation for recovering from the forward flying state to the rising state or the floating state can be performed simply by reversing the swinging direction of the control vane 23 connected to the side swing shaft (front swing shaft 22f and rear swing shaft 22r) and will thus not be described herein in detail.

FIGS. 9A to 9F show operations performed to recover the vertical take-off and landing aircraft 1 to the hovering state when the vertical take-off and landing aircraft 1 in the hovering state is thrown off balance by disturbance such as a blast of a gust of wind. FIG. 9A shows the hovering state of the vertical take-off and landing aircraft 1. In the hovering state, the propulsion mechanism 2 is oriented in the vertical direction, and sucks air from above and ejects the air downward to bring gravity and lift generated in the fuselage main body 10 into balance. At this time, all the control vane 23 is held so as to face straight down so as not to hinder air flow through the propulsion mechanism 2.

When the vertical take-off and landing aircraft 1 in the hovering state is subjected to disturbance such as a gust of wind, the vertical take-off and landing aircraft 1 as a whole may be tilted forward with the positional relations among the propulsion mechanism 2, the fuselage main body 10, and the control vane 23 maintained, for example, as shown in FIG. 9B. In this attitude, the propulsion mechanism 2 is tilted forward, and thus, the vertical take-off and landing aircraft 1 operates to fly forward against the pilot's will. Thus, first, the control vane 23 connected to the central swing shaft (swing shaft 22) is swung forward as shown in FIG. 9C. At this time, air having passed through the propeller 21b is deflected so as to be ejected downward, by the control vane 23 connected to the central swing shaft. Consequently, the vertical take-off and landing aircraft 1 can be restrained from flying forward.

Furthermore, at the same time, the control vane 23 connected to the central swing shaft generates lift backward. Thus, the propulsion mechanism 2 (subframe 5) operates to move relative to the fuselage main body 10 (main frame 4). At this time, since the fuselage main body 10 has been thrown off balance to displace the center of gravity thereof, the fuselage main body 10 (main frame 4) moves relative to the propulsion mechanism 2 (subframe 5) as shown in FIG. 9D. This operation is synonymous with movement of the propulsion mechanism 2 (subframe 5) relative to the fuselage main body 10 (main frame 4).

In the state shown in FIG. 9D, the attitude of the fuselage main body 10 has returned to the normal state. However, since the propulsion mechanism 2 is tilted forward, the vertical take-off and landing aircraft 1 fails to maintain the hovering state and operates to fly forward. Thus, a manipulation for recovering the attitude of the propulsion mechanism 2 to the normal state is then performed.

As shown in FIG. 9E, with the propulsion mechanism 2 tilted, the control vane 23 connected to the side swing shaft (front swing shaft 22f and rear swing shaft 22r) is swung backward. At this time, air having passed through the propeller 21b impinges against the rear surface of the control vane 23 connected to the side swing shaft, and the control vane 23 generates lift forward. As a result, the propulsion mechanism 2 (subframe 5) moves relative to the fuselage main body 10 (main frame 4) to swing so that the head (nose cone 21c side) of the propulsion mechanism 2 faces upward, as shown in FIG. 9F.

Finally, the control vane 23 connected to the side swing shaft (front swing shaft 22f and rear swing shaft 22r) is swung so as to establish the state shown in FIG. 9A to allow the vertical take-off and landing aircraft 1 to recover to the hovering state.

Thus, when the control vanes 23 have respective functions for deflection of thrust and for tilting of the propulsion mechanism, even if the vertical take-off and landing aircraft 1 is subjected to disturbance such as a blast of a gust of wind, the direction in which thrust is generated can be immediately deflected before the propulsion mechanism 2 is recovered to the normal state. Subsequently, the propulsion mechanism 2 can be recovered to the original state. This enables smooth and expeditious attitude control.

Figure 10A:
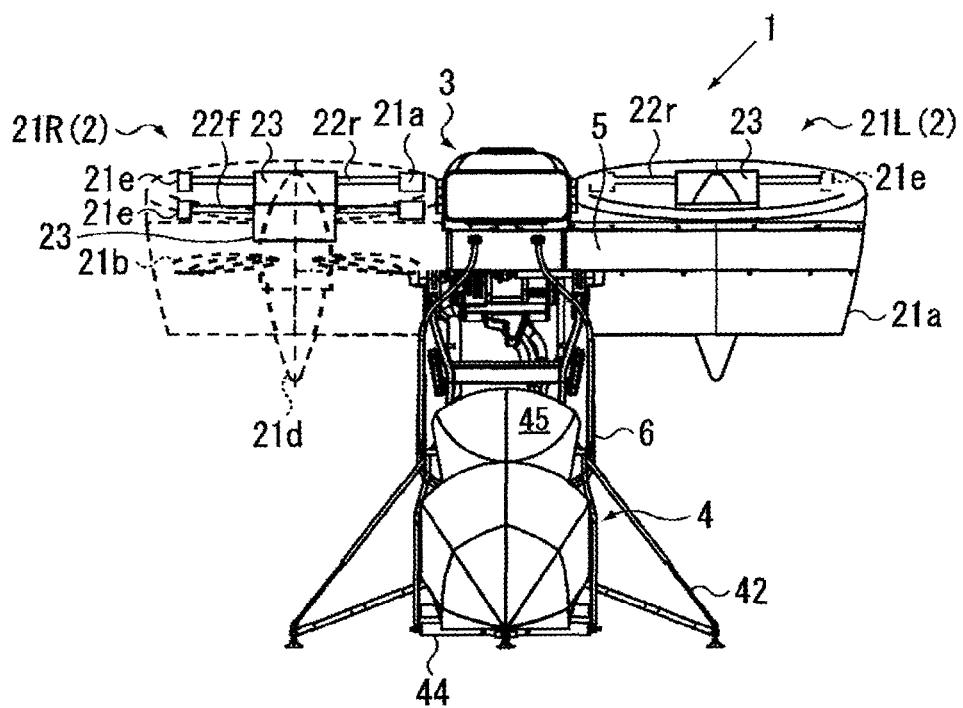
FIG. 10A is a front view showing a vertical take-off and landing aircraft according to a sixth embodiment of the present invention.
Figure 10B:
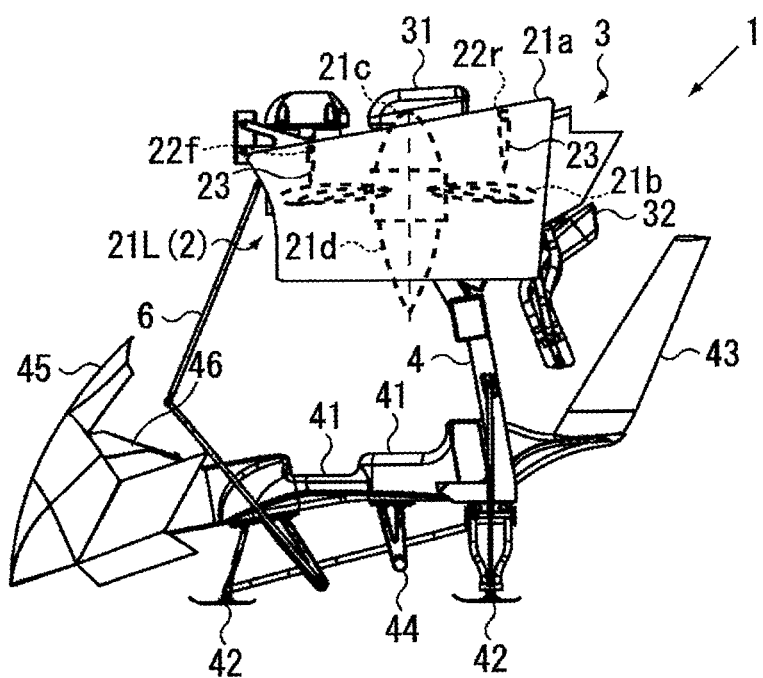
FIG. 10B is a side view showing the vertical take-off and landing aircraft according to the sixth embodiment of the present invention.
Figure 11A:
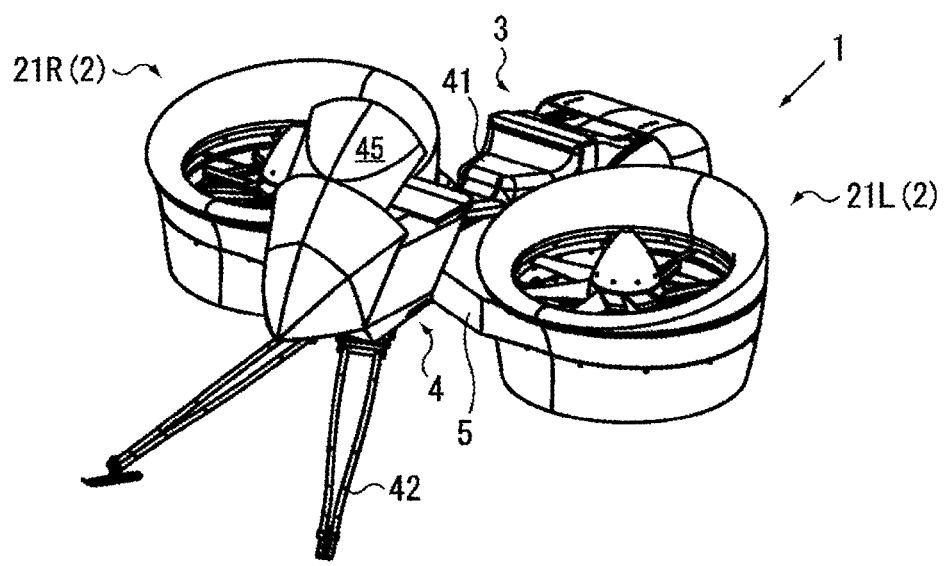
FIG. 11A is a perspective view showing a vertical take-off and landing aircraft according to a seventh embodiment of the present invention.
Figure 11B:
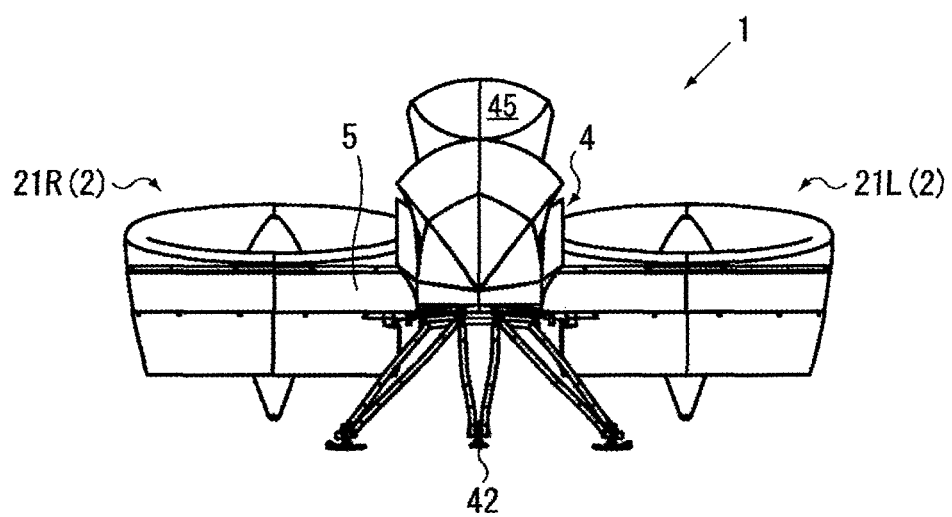
FIG. 11B is a front view showing the vertical take-off and landing aircraft according to the seventh embodiment of the present invention.
Figure 11C:
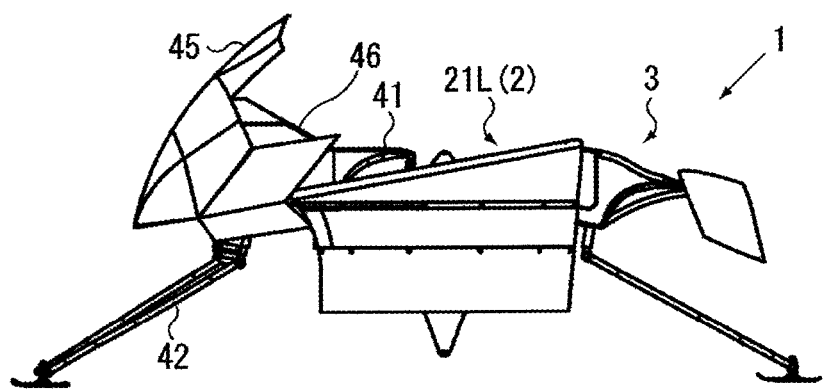
FIG. 11C is a side view showing the vertical take-off and landing aircraft according to the seventh embodiment of the present invention.

Now, vertical take-off and landing aircrafts according to other embodiments of the present invention will be described with reference to FIGS. 10A to 11C. FIG. 10A and FIG. 10B are diagrams showing a vertical take-off and landing aircraft according to a sixth embodiment of the present invention. FIG. 10A(a) is a front view, and FIG. 10B is a side view. FIGS. 11A to 11C are diagrams showing a vertical take-off and landing aircraft according to a seventh embodiment of the present invention. FIG. 11A is a perspective view, FIG. 11B is a front view, and FIG. 11C is a side view. In the figures, the same components as those of the vertical take-off and landing aircraft 1 according to the aforementioned first embodiment are denoted by the same reference signs and duplicate descriptions are omitted.

In the vertical take-off and landing aircraft 1 according to the sixth embodiment shown in FIG. 10A and FIG. 10B, the side swing shaft (front swing shaft 22f and rear swing shaft 22r) and the control vane 23 are arranged in an upper portion of each of the ducted fans 21L, 21R. Specifically, the side swing shaft and the control vane 23 are arranged in the duct 21a above the propeller 21b. Even in such a configuration, the attitude control for the vertical take-off and landing aircraft 1 can be performed by carrying out manipulations similar to those in embodiments in which the swing shaft and the control vane 23 are arranged in a lower portion of each of the ducted fans 21L, 21R.

In the vertical take-off and landing aircraft 1 according to the seventh embodiment shown in FIGS. 11A to 11C, the propulsion mechanism 2 (ducted fans 21L, 21R) is arranged below the seating 41. In this case, "below the seating 41" means that a power transmission shaft (not shown in the drawings) for the propulsion mechanism 2 is present below the seating 41. That is, the propulsion mechanism 2 is connected to the main frame 4 via the subframe 5 so as to be arranged below the seating 41. Even in the thus configured vertical take-off and landing aircraft 1, the control vane 23 illustrated in the aforementioned first to sixth embodiments is arranged in the propulsion mechanism 2 to enable the attitude control for the vertical take-off and landing aircraft 1.

The present invention is not limited to the aforementioned embodiments, and of course, many variations may be made to the embodiments without departing from the spirits of the present invention. For example, when the vertical take-off and landing aircraft 1 is tilted backward by disturbance such as a gust of wind, the swinging direction of the control vane 23 described in the FIGS. 3A to 3F and FIGS. 9A to 9F may be simply reversed. For the side swing shaft, only one of the front side swing shaft 22f or the rear swing shaft 22r may be arranged. The propulsion mechanism 2 may have two or more pairs of ducted fans or have one ducted fan at the back thereof in addition to the pair of ducted fans 21L, 21R.

A first aspect of the vertical take-off and landing aircraft according to the present invention has a propulsion mechanism that generates lift and thrust, a main frame that supports seating and a landing undercarriage, a subframe which supports the propulsion mechanism and which is arranged so as to be swingable back and forth relative to the main frame, motive power supply means supported by the main frame or the subframe and supplying motive power to the propulsion mechanism, and a control stick connected to the subframe, and the propulsion mechanism includes at least a pair of ducted fans arranged on a left side and a right side, respectively, of the main frame, swing shafts arranged in the ducted fans and extending in a horizontal direction, and control vanes connected to the swing shafts, and swinging the control vane enables the subframe to move relative to the main frame.

According to the first aspect of the present invention, the propulsion mechanism can be deflected by manipulating the control stick and can thus be controlled without addition of a mechanism that controls yawing of the fuselage. Furthermore, the subframe can be moved relative to the main frame, allowing supplementation of a force exerted to manipulate the control stick in order to deflect the ducted fans. Thus, the control stick can foe manipulated with a reduced force.

According to a second aspect of the present invention, the swing shaft is one of a central swing shaft arranged in a central portion of the ducted fan in a front-back direction, a side swing shaft arranged at a front or at a back in a channel in the ducted fan, and both the central swing shaft and the side swing shaft. Whichever of these configurations is adopted for the swing shaft, the attitude control for the vertical take-off and landing aircraft can be achieved.

In a third aspect of the present invention, when the swing shaft is the central swing shaft and the side swing shaft, the control vane connected to the central swing shaft is used to deflect the thrust of the ducted fan, and the control vane connected to the side swing shaft is used to tilt the subframe.

According to the third aspect of the present invention, even when the vertical take-off and landing aircraft is subjected to disturbance such as a blast of a gust of wind, the direction in which the thrust is generated can be immediately deflected before the propulsion mechanism 2 is recovered to the normal state. Subsequently, the propulsion mechanism can be recovered to the original state. This enables smooth and expeditious attitude control.

In a forth aspect of the present invention, the swing shaft and the control vane are arranged in an upper portion or a lower portion of the ducted fan. This aspect allows the responsiveness of the control vane to be improved.

In a fifth aspect of the present invention, the propulsion mechanism is connected to the main frame via the subframe so as to be arranged above or below the seating. Whichever of these configurations is adopted, the attitude control for the vertical take-off and landing aircraft can be performed.

In a sixth aspect of the present invention, the control stick extends from the subframe to a front of the seating, and is swung back and force to swing the subframe back and forth relative to the main frame. This aspect enables a reduction in the force needed to manipulate the control stick.

EXPLANATION OF REFERENCE SIGNS 1 vertical take-off and landing aircraft
2 propulsion mechanism
3 motive power supply means
4 main frame
5 subframe
6 control stick
21L, 21R ducted fans
22 swing shaft (central swing shaft)
22f front swing shaft (side swing shaft)
22r rear swing shaft (side swing shaft)
23 control vane
41 seating
42 landing undercarriage

The invention claimed is:
1. A vertical take-off and landing aircraft comprising:
a propulsion mechanism that generates lift and thrust;
a main frame that supports seating and a landing undercarriage;
a subframe which supports the propulsion mechanism and which is arranged so as to be swingable back and forth relative to the main frame;
motive power supply means supported by the main frame or the subframe and supplying motive power to the propulsion mechanism; and
a control stick connected to the subframe,
wherein the propulsion mechanism comprises at least a pair of ducted fans arranged on a left side and a right side, respectively, of the main frame, a swing shaft arranged in each of the ducted fans and extending in a direction perpendicular to a front-back direction of the vertical take-off and landing aircraft, and a control vane connected to the swing shaft; and
wherein the swing shaft includes a central swing shaft arranged in a central portion of the ducted fan in the front-back direction and a side swing shaft arranged at a front or at a back in a channel in the ducted fan, and
the control vane connected to the central swing shaft is used to deflect the thrust of the ducted fan, and swinging the control vane connected to the side swing shaft enables the subframe to swing back and forth relative to the main frame.

2. The vertical take-off and landing aircraft according to claim 1, wherein the swing shaft and the control vane are arranged in an upper portion or a lower portion of the ducted fan.

3. The vertical take-off and landing aircraft according to claim 1, wherein the propulsion mechanism is connected to the main frame via the subframe so as to be arranged above or below the seating.

4. The vertical take-off and landing aircraft according to claim 1, wherein the control stick extends from the subframe to a front of the seating, and is swung back and force to swing the subframe back and forth relative to the main frame.

* * * * *